July 2, 1957     E. L. O'BRIEN     2,798,143
PERCOLATOR CONTROL

Filed March 19, 1953     2 Sheets-Sheet 1

INVENTOR
EDWARD L. O'BRIEN
BY
ATTORNEY

July 2, 1957  E. L. O'BRIEN  2,798,143
PERCOLATOR CONTROL

Filed March 19, 1953  2 Sheets-Sheet 2

INVENTOR
EDWARD L. O'BRIEN
BY R. J. Eisinger
ATTORNEY

United States Patent Office 2,798,143
Patented July 2, 1957

2,798,143

PERCOLATOR CONTROL

Edward L. O'Brien, Mansfield, Ohio, assignor to Westinghouse Electric Corporation, East Pittsburgh, Pa., a corporation of Pennsylvania Application March 19, 1953, Serial No. 343,429

9 Claims. (Cl. 219—44)

This invention relates to electric coffee makers, particularly to automatic electric coffee makers of the percolator type in which percolation is effected by a steam-actuated pump.

It is an object of the invention to provide an automatic electric coffee maker of the percolator type in which the brewing period is rapidly completed.

It is another object of the invention to provide, in a coffee maker of the above type, a heating arrangement for shortening the period during which the pumping rate of a steam-actuated percolating pump is below the maximum rate, whereby the pump is operable at its maximum pumping efficiency for a greater portion of the coffee making period than heretofore.

A more specific object of the invention is to provide, in a coffee maker having a steam-actuated percolating pump, a heating arrangement for rendering the pump operable at its maximum pumping efficiency during the major portion of the brewing period, regardless of the amount of coffee being brewed.

I have found that, in coffee makers of the percolator type having a steam-actuated pump disposed in a well formed in the vessel, the volume of water pumped per minute for effecting the coffee infusion increases as the temperature of the main body of water in the vessel increases, up to a certain critical temperature. This temperature is approximately 160° F. Above this temperature, the pumping rate remains substantially constant until the water approaches the boiling point, at which time the pumping rate decreases rapidly to a very low value.

Briefly, my invention resides in the provision of a high wattage electrical heater arranged to heat the water in the main vessel rapidly to the temperature required for maximum efficiency of the percolating pump. This heater, which I term a booster heater, is remote from the percolating pump and is controlled by a thermostat, for example, a creep-acting thermostat.

The heater for actuating the pump is arranged adjacent the pump, is of considerably lower wattage than the booster heater and is controlled by a thermostat which has contacts retainable in the open position. The pump heater thermostat is set to open its contacts at a higher temperature than the booster heater thermostat and serves to terminate the brewing period.

In operation, the booster heater and the pump heater are jointly energized initially and percolation is initiated by the pump heater after approximately one minute. The frequency of percolation is rapidly increased as the water in the vessel is heated by the booster heater, and attains a maximum when the liquid in the vessel is raised to a temperature on the order of 160° F. The booster heater is then cut off by the creep-acting thermostat and the pump heater continues alone to brew the coffee. When the brewing period has continued for a predetermined length of time, the liquid in the vessel attains the temperature for which the pump heater thermostat is set and the pump heater is cut off to end the brewing period. Thus, the pump heater thermostat serves to time the brewing period.

As the coffee brew cools, the booster heater will subsequently be intermittently turned on and off by the creep thermostat to maintain the brew at a normal drinking temperature.

The above arrangement provides a uniform brew in a short period of time when substantially uniform quantities of coffee are to be brewed.

A further feature of my invention resides in provision for attaining a uniform brew with an accelerated brewing period, as outlined above, when widely dissimilar quantities of coffee are to be brewed in the same coffee maker. For example, in an eight-cup coffee maker, two cups or four cups of coffee can be brewed, without sacrificing uniformity of brew or speed of brewing, by incorporating temperature compensation means in the thermostat for controlling the booster heater operation.

The above and other objects are attained by my invention as will be apparent from the following description taken in connection with the accompanying drawings, forming a part of this application, in which.

Figure 1:
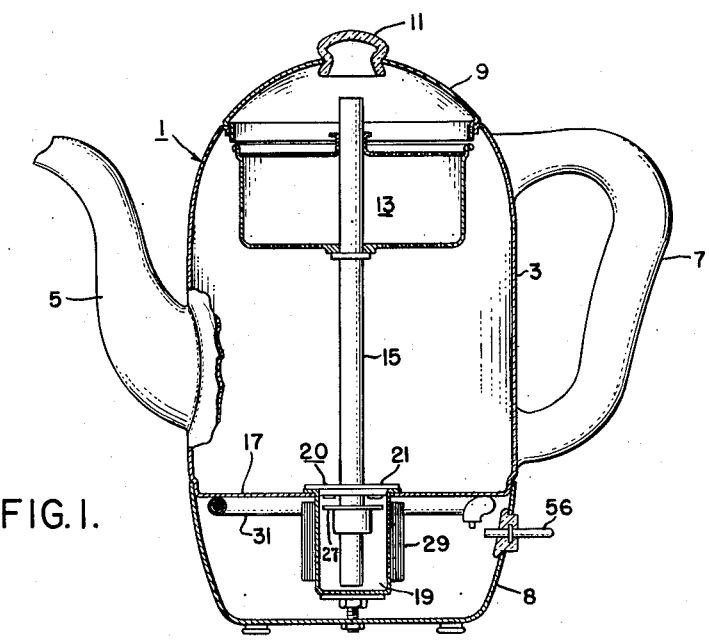
Fig. 1 is a vertical section, with parts in elevation, showing a coffee maker having my invention incorporated therein.

Referring to the drawings in detail, especially Fig. 1, there is shown a coffee maker 1, having a vessel 3 of generally cylindrical form and having attached thereto a spout 5 and a handle 7. The vessel 3 has a removable lid 9, disposed at the top thereof, which may be provided with a liquid spreader means 11. Within the vessel there is disposed a foraminous coffee infusion chamber or basket 13, which has attached thereto an upstanding fountain tube 15 supported on the lower surface of the vessel and extending upwardly into proximity with the spreader 11.

The vessel 3 has a bottom wall 17, which may be substantially flat and which is provided with a centrally disposed well 19, attached thereto at its upper end and extending downwardly therefrom.

Figure 2:
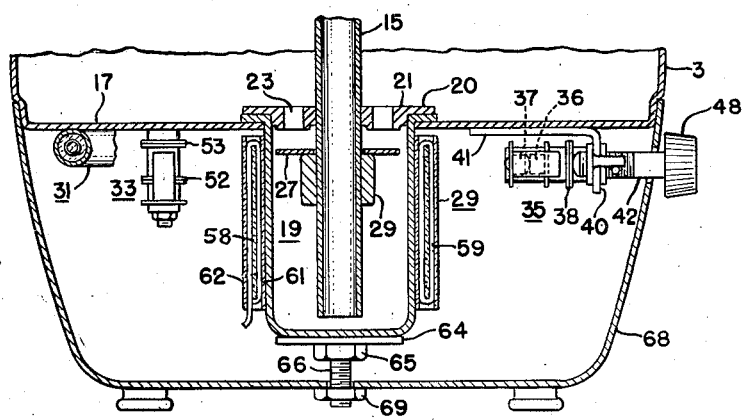
Fig. 2 is a vertical section taken on line II—II of Fig. 3 and showing only the lower portion of the coffee maker.

Referring to Fig. 2, the well 19 forms the bottom and side walls of a pumping chamber for a steam-actuated percolation pump 20. The top wall of the pumping chamber is formed by a circular valve portion 21 having apertures 23 extending vertically therethrough and attached to the fountain tube 15. The lower end portion of the fountain tube 15 extends into the well 19 and has a collar 25 fastened thereto which serves to support a valve disc 27. The valve disc 27 is loosely mounted on the fountain tube 15 and is normally seated on the collar 25 by the action of gravity, but is freely slidable upwardly to seal the apertures 23, as will be later described. The fountain tube 15, the valve portion 21 and the valve disc 27, form a substantially unitary assembly which may be detached from the vessel as a unit with the infustion basket 13. If desired, the basket 13 may be made separable from the fountain tube 15.

A heater 29 of cylindrical shape is attached to the outer wall of the well 19, and a tubular sheathed heater 31 is attached to the lower surface of the bottom wall 17 of the vessel. The heater 31 will be referred to as a booster heater, since it is adapted to preheat liquid in the vessel 3 in preparation for pumping, while the heater 29 will be referred to as a pump heater, since it serves to actuate the pump 20 by heating liquid disposed in the well 19.

Figure 3:
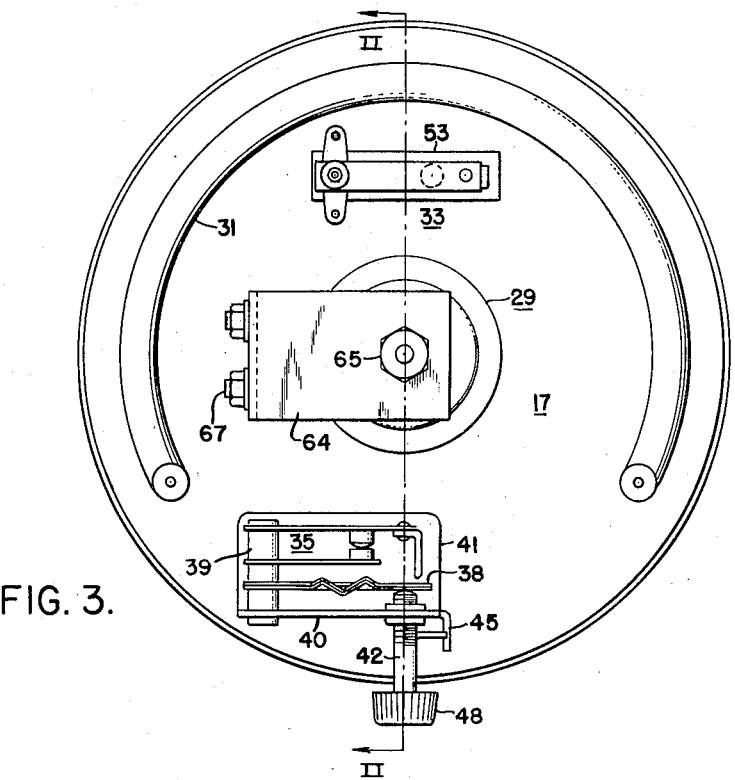
Fig. 3 is a bottom plan view of the coffee maker shown on Fig. 1 but on a larger scale and with the bottom shell omitted.
Figure 4:
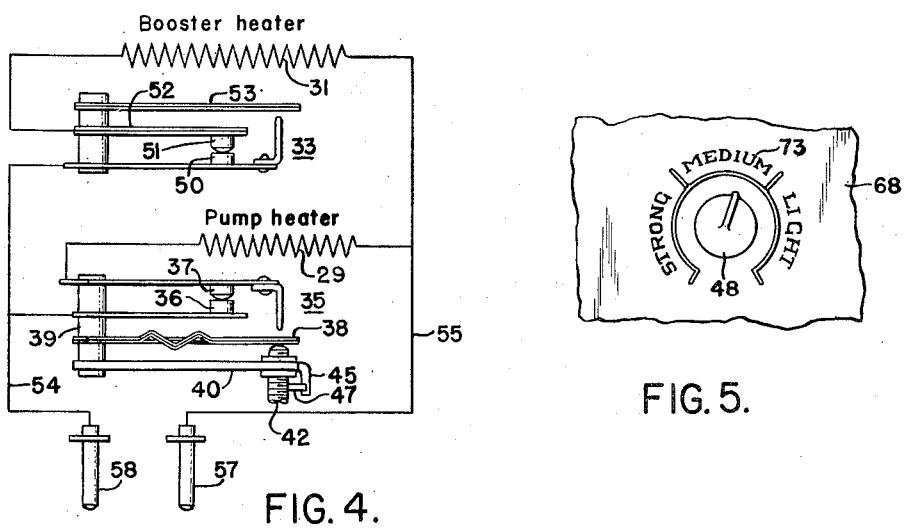
Fig. 4 is a schematic wiring diagram showing the control circuit for the coffee maker.

As shown in Fig. 4, the booster heater 31 is controlled by a thermostat 33, while the pump heater 29 is controlled by a thermostat 35. As shown in Figs. 2 and 3, the thermostats 33 and 35 are attached to the bottom wall 17, so as to respond to the temperature of the main body of water within the vessel.

As well understood in the art, the pump 20 operates in the following manner. Water in the vessel 3 flows down by gravity through the apertures 23 into the well 19 and fills the same. Heat generated by the pump heater 29 vaporizes liquid in the well 19 and the steam pressure formed thereby causes the valve disc 27 to raise upwardly to seal the apertures 23. The steam then forces the liquid in the well 19 upwardly through the fountain tube 15 into the spreader 11, from whence it will fall back into the infusion basket 13 and filter therethrough into the vessel 3. After the liquid rises in the fountain tube 15, the steam within the well 19 will be exhausted through the fountain tube and the valve disc will drop onto the collar 25 to repeat the above cycle until the infusion is interrupted. This interruption may be obtained by means of the thermostat 35.

The thermostat 35 which controls the pump heater 29 may be of any type that trips to the "Open" position, since its main purpose is to deenergize the pump heater 29 to terminate the brew. As shown, the thermostat 35 has a bimetal 38 of the inherently snap-acting type arranged to deflect, when heated, in the direction to move a movable contact 37 out of engagement with a contact 36 to interrupt the electrical circuit through the pump heater.

The snap-acting bimetal 38 has a wide temperature differential and this characteristic is utilized to prevent reenergization of the pump heater after the brew is completed. For example, when the snap-acting bimetal is heated to a temperature at which it snaps in contact-opening direction, it remains in the contact-opening position until the temperature falls well below the contact-opening temperature to a temperature slightly higher than normal room temperature (about 100° F.), at which temperature it snaps back to its former position to reclose the contacts. Since, as will subsequently be further described, the coffee maker temperature will not fall to 100° F. until it is detached from the power supply, the thermostat 35 is effective to maintain the pump heater in deenergized condition until it is desired to perform a subsequent coffee making operation. The bimetal 38 is attached at one end to a stack structure 39 which, in turn, is attached to the depending portion 40 of an L-shaped sheet metal support 41, as best shown in Figs. 2 and 3. The support 41 serves as a mounting for the thermostat on the bottom wall 17 of the vessel. A threaded adjusting shaft 42 passes through the depending portion 40 of the support 41 and engages the free end of the bimetal 38 to adjust the opening temperature of the thermostat, as well understood in the art. I prefer to have the thermostat adjustable within the limits of 180° F. and 200° F. and have provided a stop 45 on the support 41 which cooperates with a stop lug 47 mounted on the adjusting shaft 42. With this arrangement, the adjusting shaft 42 is rotatable within the limits of the temperature stated above. The end of the adjusting shaft 42 is provided with a knob 48, which is accessible to the operator for adjustment and serves to permit variation of strength of the brew in accordance with the individual taste of the user. For example, when the knob 48 is set to the high setting, namely, 200° F., the percolation cycle is lengthened and the pump heater 29 will be actuated for a greater length of time which, in turn, results in a stronger brew. Conversely, when the knob 48 is set to a lower setting; for example, 180° F. the thermostat will interrupt the circuit through the pump heater and interrupt the infusion after a shorter length of time, with a resulting lighter brew.

The infusion action of water increases with increase in its temperature; that is, the rate at which soluble solids are extracted from the ground coffee increases as the temperature of the water increases. Obviously, during the early part of the cycle, the water pumped into the infusion basket is chilled by the relatively cold basket and coffee bed.

Also, the rate at which water is delivered by the pump to the infusion basket increases until the water in the vessel 3 attains a temperature of approximately 160° F. When the temperature of the water approaches boiling the pumping action falls off sharply, since steam is generated so rapidly in the well that little water can enter the well before the valve disc 27 is lifted by steam. Thus, during the early part of the cycle, infusion occurs at a relatively low rate and increases as the temperature of the liquid in the vessel 3 rises to a temperature just below the boiling point (approximately 200° F.), at which temperature the pumping action and hence the infusion action is greatly reduced.

The booster heater 31 is of higher heating capacity than the pump heater 29 and serves to heat the liquid in the vessel 3 rapidly to the most efficient temperature for pumping.

The thermostat 33 which controls the booster heater 31 serves two functions. On the first cycle it deenergizes the booster heater when the liquid is heated to the most efficient temperature for pumping, and after the brew is completed it turns the booster heater on and off to maintain the liquid in the vessel at a constant temperature. The thermostat 33 comprises a main actuating bimetal 53 of the strip type which serves to move a movable contact 50 out of engagement with a contact 51 in response to a rise in temperature of the bottom wall 17 of the vessel 3 and the ambient temperature. The contact 51 is carried by an arm 52 which, as shown, may be a compensating bimetal and is arranged to move in contact-closing direction when heated, for a purpose which will be described subsequently. This thermostat may be adjusted, by means not shown, to disengage the contacts at a temperature above 160° F. I prefer to adjust the contacts to open at a temperature of about 170° F., in order to reduce the over-all brew period.

As shown in Fig. 4, the booster heater 31 and its thermostat 33 are connected in parallel with the pump heater 29 and its thermostat 35, by a pair of wires 54 and 55 leading to a pair of connectors 56 and 57, respectively, which may, in turn, be connected to a source of electrical supply as well understood in the art.

The pump heater 29 is shown as of the sandwich type having a center sheet of insulation 58 about which a wire resistor 59 is helically wound and having insulating sheets 61 and 62 disposed on the inner and outer surfaces of the wire 59, respectively. The insulating sheets electrically insulate the resistor 59 from the well 19 and other metal members while permitting heat to be freely transmitted to the well 19.

It will be noted that the pump heater 29 is isolated from the bottom wall 17, while the booster heater 31 is isolated from the well 19. Thus, the function of the pump heater 29 is to heat liquid in the well 19 for pumping purposes, as mentioned previously, while the main function of the booster heater 31 is to heat the liquid in the vessel 3 to the most efficient pumping temperature. The booster heater also serves to maintain the brew at a normal drinking temperature.

A bracket 64 of L-shape is attached to the lower wall of the well 19 in any desired manner, for example, by a nut 65 threadedly received on a stud 66. The bracket serves as a terminal mounting structure for the various leads from the thermostats and heaters, as well understood in the art, and is shown as being provided with a pair of threaded terminals 67 to effect such connections.

A shell 68 of cup-shape, serving to enclose the working mechanism of the coffee maker, may be secured to the vessel 3 by a nut 69 received on stud 66 attached to the well.

Figure 5:
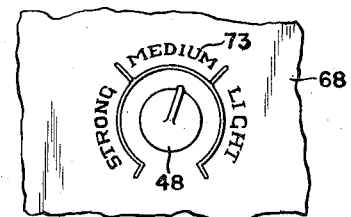
Fig. 5 is a fragmentary elevation showing the knob for adjusting the brew strength.

As shown in Figs. 2 and 5, the thermostat adjusting shaft 42 extends through an opening in the shell 68 and legends 73 may be provided on the outer surface of the shell to indicate the setting of the knob 48.

Operation in general

It will be assumed that the coffee maker is of the eight-cup size. To initiate a coffee making operation, the coffee maker is charged with coffee and water in the usual manner and then connected to a source of electrical supply (not shown). The heaters 29 and 31 are simultaneously energized and the following action occurs after the lapse of a short amount of time. Water in the well 19 is heated by the heater 29 to the point where the increase in vapor pressure forces the valve disc 27 upwardly into engagement with the apertures 23 to initiate the percolation action previously described.

At first, percolation is relatively slow, since the liquid in the vessel 3 is at a low temperature, on the order of 70° F. (tap water temperature). The booster heater 31, however, has a high rate of heat output and since it is in good thermal contact with the vessel 3, it serves to rapidly heat the liquid in the vessel 3 to 160° F. As the temperature of the liquid in the vessel 3 approaches 160° F. the percolation action is accelerated and the frequency of percolation is increased up to the maximum efficiency of the pump. When the liquid in the vessel attains a temperature of 170° F., the thermostat 33 interrupts the circuit through the booster heater 31. Thereafter, the pump heater 29 operates alone to continue the infusion of the liquid until the brew attains a temperature of 180° F. to 200° F. (as determined by the setting of the adjustment knob 48), at which time the thermostat 35 interrupts the circuit through the pump heater 29 with a snap action to terminate the coffee making period. The thermostat 35 remains in the contact-opening position until the temperature falls to 100° F., at which time it snaps back to its former position to reclose the contacts, thereby conditioning the coffee maker for subsequent use.

Should the coffee maker be left attached to the power supply after the infusion is terminated, the thermostat 33 recloses the circuit through the booster heater 31 when the temperature of the brew falls to 170° F., thereby maintaining the brew in the vessel at a serving temperature. The thermostat 33 thereafter intermittently energizes and deenergizes the booster heater to maintain the coffee at the serving temperature indefinitely and prevents the pump heater thermostat from reclosing the circuit through the pump heater.

Operation with ambient temperature compensation

A further feature of the invention resides in provision for more accurately controlling the infusion period when varying amounts of coffee are made in the same coffee maker. For example, in the eight-cup coffee maker described, it may be desirable to make two cups or four cups of coffee of the same strength without readjusting the knob 48 previously set in accordance with the taste of the operator. In accordance with my invention, the above is attained by temperature-responsive means for compensating for variation in ambient temperatures within the shell 68.

As shown in Figs. 2 and 4, the thermostat 33 is temperature compensated by the bimetal arm 52 which supports the contact 51. The bimetal arm 52 is arranged to move the contact 51 toward the contact 50 upon a rise in temperature and in the opposite direction upon a fall in temperature.

The side walls of the shell 68 together with the bottom wall 17 of the vessel form a casing enclosing the booster heater and its thermostat and the pump heater and its thermostat. During a coffee making period, the ambient temperature within the shell 68 rises continuously, principally due to stray heat from the heaters 29 and 31. Thus, heat is transmitted to the thermostat 33 directly through the air in addition to the heat transmitted to the thermostat through the bottom wall 17 of the vessel.

As the ambient temperature rises, the main bimetal 53 is influenced thereby and moves in contact-opening direction to a position nearer the contact 50 than the bottom wall temperature calls for. Without compensation, the bimetal 53 would move the contact 50 out of engagement with contact 51 before the bottom wall 17 attains 170° F. However, the compensating bimetal 52 is also influenced by rise in the ambient and is shifted in contact-closing direction an amount equal to that part of the movement of the main bimetal 53 that is due to rise in the ambient temperature, thereby nullifying the shift in the main bimetal 53 caused by rise in the ambient. With this arrangement, the effect of the ambient on the opening temperature of the thermostat is minimized and the thermostat is responsive chiefly to the temperature of the bottom wall 17.

Figure 6:
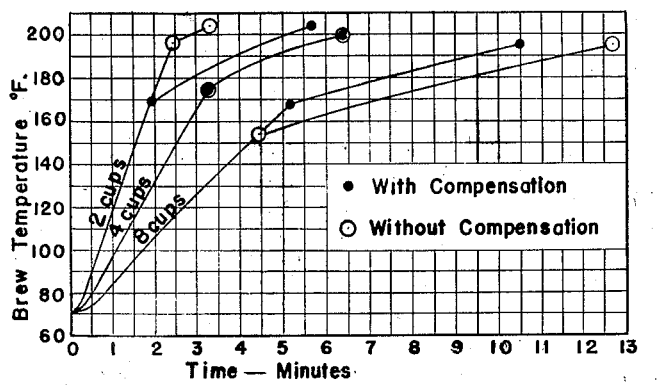
Fig. 6 is a chart showing a comparison between brewing periods when different amounts of coffee are brewed.

The chart shown in Fig. 6 contains two families of curves. One family of curves, indicated by solid circles, represents percolation time and brew temperature for a temperature-compensated coffee maker, while the other family, indicated by open circles, shows analogous values attained with an uncompensated coffee maker.

For comparison purposes, the following values will be considered. These values were attained by actual test of eight-cup coffee makers made in accordance with my invention and similar in all aspects except that one was provided with compensation while the other was not provided with compensation. Both coffee makers were adjusted to operate properly with four cups of water.

WITH COMPENSATION

| Cups of Liquid | Coffee Making Period, Min. | Temp. of Brew at Booster Cut-Off, ° F. |
|---|---|---|
| (A) | (B) | (C) |
| 2 | 5.65 | 170 |
| 4 | 6.4 | 174 |
| 8 | 10.5 | 168 |

WITHOUT COMPENSATION

| (A') | (B') | (C') |
|---|---|---|
| 2 | 3.3 | 196 |
| 4 | 6.4 | 174 |
| 8 | 12.7 | 154 |

Referring to columns B and B', it will be noted that the coffee making period varies with the amount of liquid contained in the vessel 3.

In column C it will be noted that, in the temperature compensated coffee maker, the temperature at which the booster heater is cut off is substantially constant regardless of the quantity of liquid in the vessel. I have found by actual tests that, with the above arrangement, coffee of uniform strength may be brewed in this coffee maker in varying quantities of two cups to eight cups. As previously mentioned, the main function of the booster heater is to quickly heat the liquid to the temperature at which maximum pumping efficiency begins. Obviously, if the booster heater is energized for a longer period of time, it heats the liquid to a higher temperature and the coffee making period is shortened, resulting in a weaker brew. If the heater is energized for a shorter period of time, it heats the liquid to a lower temperature and the coffee making period is lengthened, resulting in a stronger brew.

In column C' it will be noted that, in the uncompensated coffee maker, the temperature at which the booster heater is cut off decreases as the quantity of liquid in the vessel is increased. Since, as previously mentioned, this coffee maker was adjusted to operate properly at the median value of four cups, the booster heater is deenergized at the proper temperature value and the brew is of the desired strength when four cups of coffee are brewed. Comparing columns B and B', it will be noted that in both coffee makers the coffee making periods for four cups is of the same length.

When two cups are brewed, the effect of stray heat on the booster heater thermostat is less than with four cups and the booster heater is denergized when the liquid is at a temperature considerably higher than required. In this instance, the brew is weaker than desired. Comparing columns B and B', it will be noted that the coffee making period is accordingly shorter than required.

When eight cups of coffee are brewed, the effect of stray heat on the booster heater thermostat is greater than with four cups and the booster heater is deenergized when the liquid is at a temperature lower than required. In this instance, the brew is stronger than desired. A comparison of columns B and B' shows that in this instance, the coffee making period is longer than required.

It will now be seen that with compensation the temperature at which the booster heater is cut off is substantially constant and that the pump heater operates alone from a substantially constant temperature base (168° F. to 174° F.) to heat the liquid to the temperature required to terminate brewing. With this arrangement brewing can be more accurately predetermined with a resulting uniform coffee brew regardless of the quantity of coffee being brewed.

The above is attained by minimizing the effects of stray heat on the booster heater thermostat 33. As previously noted in column C', the effects of stray heat on the thermostat 33 are such that, although the thermostat 33 is set to open the booster heater circuit when the vessel is at a temperature of about 170° F., the vessel temperature varies from 154° F. to 196° F. as the liquid content of the vessel varies from eight cups to two cups.

Although the pump heater thermostat 35 may also be compensated, if desired, I find that it is unnecessary, since it is set to snap open at a temperature which is higher than that of the thermostat 33. Also, after the booster heater 31 is deenergized by the thermostat 33, the stray heat emitted by the booster heater is diminished and has little effect on the final opening temperature of the thermostat 35. The pump heater 29, being of considerably smaller heat output than the booster heater, has a relatively small effect upon the ambient temperature within the shell 68 and, to all intents and purposes, its effect may be disregarded.

It will now be seen that I have provided a percolator type of coffee maker in which varying amounts of coffee may be made without sacrificing uniformity and without the need for readjusting the knob 48 when different amounts of coffee of the same desired strength are to be brewed. Also, I have provided a coffee maker having a steam-actuated percolation pump which is operated at its most efficient temperature for a larger portion of the coffee making cycle than heretofore, with the result that the percolation cycle is considerably shortened, permitting the making of coffee in a shorter time than heretofore.

While the invention has been shown in but one form, it will be obvious to those skilled in the art that it is not so limited, but is susceptible of various changes and modifications without departing from the spirit thereof.

What I claim is:

1. An electric percolator comprising a liquid receiving vessel having a bottom wall, a steam-actuated pump having a pumping chamber and a fountain tube, said tube having its lower end in communication with said pumping chamber, a first heater disposed in heat transfer relation to said pumping chamber and a second heater disposed in heat transfer relation to said vessel remotely from said chamber, said second heater being of greater heating capacity than the first heater, said heaters being connected in parallel with each other, a first thermostat having a large temperature differential and controlling said first heater, and a second thermostat having a low temperature differential and controlling said second heater, both said thermostats being arranged to respond to the temperature of the liquid contents of said vessel during a percolating operation, said second thermostat being adjusted to move to circuit-interrupting position at a lower temperature than said first thermostat and to move to circuit-making position at a higher temperature than said first thermostat.

2. An electric percolator comprising a vessel having a bottom wall, a side wall depending from said bottom wall and together therewith forming a housing, a steam-actuated percolating pump having a pumping chamber and a fountain tube, a first heater disposed in heat transfer relation to said chamber for actuating said pump, a second heater disposed in heat transfer relation to said bottom wall remotely from said pumping chamber for assisting said first heater in heating water contained within said vessel, and thermostatic means disposed within said housing for deenergizing said heaters in response to changes in temperature of said bottom wall, said thermostatic means comprising a creep-acting thermostat for deenergizing said second heater at a first temperature and a snap-acting thermostat for open-circuiting said first heater at a second and higher temperature and maintaining the same in open-circuit condition to terminate the percolating period, said creep-acting thermostat being provided with temperature-responsive compensating means for minimizing the effect of the ambient temperature in said housing on said creep-acting thermostat.

3. An electric percolator comprising a vessel having a bottom wall, a side wall depending from said bottom wall and together therewith forming a housing, a steam-actuated percolating pump having a pumping chamber and a fountain tube, a coffee infusion basket disposed in the upper portion of said vessel, said tube having its lower end in communication with said pumping chamber and its upper end in communication with said basket, a low wattage heater disposed in heat transfer relation to said chamber for operating said pump, a high wattage heater disposed in heat transfer relation to said bottom wall for accelerating the heating of water contained within said vessel and thermostatic means in said housing for controlling said heaters and responsive to temperatures of said bottom wall, said thermostatic means including a first thermostat for deenergizing said high wattage heater at a first temperature and a second thermostat for deenergizing said low wattage heater at a second temperature higher than said first temperature and maintaining the same in deenergized condition to terminate the brewing period, said first thermostat having a compensating bimetal member responsive to the ambient temperature of said housing and effective to minimize the effect of said ambient on said first thermostat, said first thermostat and said high wattage heater being connected independently of said second thermostat for further controlling said high wattage heater at said first temperature after said brewing period is terminated.

4. An electric percolator comprising a vessel having a bottom wall, a coffee infusion basket disposed in the upper portion of said vessel, a steam-actuated percolating pump having the characteristic of increasing in pumping rate with increase in water temperature, said pump having a pumping chamber and a fountain tube, said tube having its lower end in communication with said pumping chamber and its upper end in communication with said basket, a low wattage heater and a high wattage heater switch means for rendering said heaters jointly operable to initiate a coffee making period, said period including an initial portion in which said pump operates at less than maximum efficiency, said low wattage heater being disposed adjacent said chamber for actuating said pump, said high wattage heater being disposed for heating water contained within said vessel to a predetermined temperature, whereby said initial portion of said coffee making period is shortened and said pump is operable at substantially its maximum rate for a greater portion of said period, and thermostatic means arranged to respond to the temperature of said water for deenergizing said high wattage heater in response to said predetermined water temperature, said low wattage heater thereafter continuing alone to complete the coffee making period.

5. An electric percolator comprising a vessel having a bottom wall, a coffee infusion basket disposed in the upper portion of said vessel, a steam-actuated percolating pump having a pumping chamber and a fountain tube having its lower end in communication with said pumping chamber, a low wattage heater disposed in heat transfer relation to said chamber for operating said pump, a high wattage heater disposed in heat transfer relation to said vessel for accelerating the heating of water within said vessel, a first thermostat adjacent said bottom wall and responsive to the temperature of said water for deenergizing said high wattage heater at a first water temperature and a second thermostat responsive to the temperature of said water for deenergizing said low wattage heater at a second and higher water temperature to terminate the operation of said pump and maintaining said low wattage heater deenergized independently of decrease in temperature of said bottom wall to said first temperature, said high wattage heater being controlled thereafter by said first thermostat to maintain the brew at said first temperature.

6. An electric percolator structure comprising a vessel for containing a liquid and having a bottom wall, an infusion basket disposed adjacent an upper portion of said vessel, a steam actuated percolating pump having a pumping chamber at the bottom of said vessel, a fountain tube having one end in communication with said chamber and its other end in communication with said basket, said pump having means for intermittently admitting liquid from said vessel to said chamber during a percolating period, a first heater disposed at said pump for heating liquid in said chamber to at least partially vaporize the liquid and force it from said chamber through said tube to said infusion basket, a second heater of higher wattage disposed remotely from said pumping chamber for rapidly heating liquid contained in said vessel to a first predetermined temperature during an initial portion of the percolating period, a thermostat arranged to respond to the temperature of liquid in said vessel for deenergizing said second heater when the liquid reaches said first predetermined temperature, means for energizing said first heater subsequent to deenergization of said second heater to operate said pump and further raise the temperature of said liquid to complete a percolating period.

7. An electric percolator structure as described in claim 6, said structure including a side wall depending from said bottom wall and together therewith defining a housing, said thermostat being disposed in said housing and including ambient temperature compensating means responsive to the ambient temperature within said housing, and switch means for deenergizing said first heater to terminate operation of said pump, said thermostat being effective after termination of the percolating period by said switch means to intermittently energize and deenergize said second heater to maintain the liquid in said vessel at said predetermined temperature while said pump is inactive.

8. An electric percolator structure as described in claim 6 in which said first heater gradually raises the temperature of the liquid in said vessel during a percolating period from said first predetermined temperature to a higher predetermined temperature and thermostatic switch means arranged to respond to the temperature of liquid in said vessel for denergizing said first heater when the liquid reaches said higher temperature to terminate the percolating period.

9. An electric percolator structure as described in claim 8 (dependent on claim 6) in which said thermostat is effective, after termination of the percolating period by said thermostatic switch means, to intermittently energize and deenergize said second heater to maintain the liquid in said vessel at said first predetermined temperature while said pump remains inactive.

References Cited in the file of this patent

UNITED STATES PATENTS

| | | |
|---|---|---|
| 1,743,073 | Simmons | Jan. 7, 1930 |
| 2,175,727 | Graham | Oct. 10, 1939 |
| 2,181,090 | Lucia | Nov. 21, 1939 |
| 2,329,116 | Heilman | Sept. 7, 1943 |
| 2,576,432 | Wilcox | Nov. 27, 1951 |
| 2,611,070 | Chandler | Sept. 16, 1952 |
| 2,641,681 | Willman | June 9, 1953 |
| 2,657,300 | Sullivan | Oct. 27, 1953 |
| 2,689,290 | Mertler | Sept. 14, 1954 |
| 2,698,368 | Lehr | Dec. 28, 1954 |